United States Patent [19]
Kirker

[11] Patent Number: 5,418,347
[45] Date of Patent: May 23, 1995

[54] METHOD AND APPARATUS FOR FUSING TERMINAL OR COMMUTATOR WIRE CONNECTIONS USING A TRIGGER CURRENT

[75] Inventor: Eric J. Kirker, Vandalia, Ohio

[73] Assignee: Odawara Automation Inc., Tipp City, Ohio

[21] Appl. No.: 64,760

[22] Filed: May 19, 1993

[51] Int. Cl.⁶ .............................................. B23K 11/24
[52] U.S. Cl. ................................ 219/110; 219/86.41
[58] Field of Search ................. 219/86.41, 91.21, 110

[56] References Cited

U.S. PATENT DOCUMENTS

| | | | |
|---|---|---|---|
| 3,045,103 | 7/1962 | Warner | 219/78 |
| 3,538,293 | 11/1970 | Procacino | 219/91.21 |
| 4,072,843 | 2/1978 | Szabo | 219/91.21 |
| 4,356,373 | 10/1982 | Mattson et al. | 219/86.31 |
| 4,371,772 | 2/1983 | Szantho et al. | 219/89 |
| 4,451,722 | 5/1984 | Szantho et al. | 219/86.25 |
| 4,504,724 | 3/1985 | Szantho et al. | 219/86.25 |
| 4,510,370 | 4/1985 | Szantho et al. | 219/86.25 |
| 4,650,948 | 3/1987 | Riordan | 219/56.1 |
| 4,675,494 | 6/1987 | Dilay | 219/91.21 |
| 4,721,906 | 1/1988 | Ferguson et al. | 324/132 |
| 4,788,407 | 11/1988 | Flater | 219/120 |
| 4,876,430 | 10/1989 | Herschitz et al. | 219/110 |
| 5,063,279 | 11/1991 | Rossi | 219/86.51 |
| 5,064,987 | 11/1991 | Braman | 219/110 |
| 5,111,015 | 5/1992 | Riordan | 219/56.22 |
| 5,272,306 | 12/1993 | Hirane | 219/110 |
| 5,300,753 | 4/1994 | Rossi | 219/110 |

*Primary Examiner*—Clifford C. Shaw
*Attorney, Agent, or Firm*—Thompson, Hine And Flory

[57] ABSTRACT

An apparatus for fusing a workpiece including at least two electrically conductive elements comprising:
  an electrode;
  means for moving the electrode into contact with said workpiece causing said electrode to contact and apply a force to said workpiece;
  means for generating a trigger current upon contacting said workpiece with said electrode;
  means for detecting said trigger current and initiating a welding current which fuses said elements;
  and means for generating said welding current.

17 Claims, 4 Drawing Sheets

# METHOD AND APPARATUS FOR FUSING TERMINAL OR COMMUTATOR WIRE CONNECTIONS USING A TRIGGER CURRENT

BACKGROUND OF THE INVENTION

This invention generally relates to a fusing apparatus and, more particularly, to a machine for fusing the armature wires of an electric motor to a tang or slot of a commutator bar and for fusing wires to stator hooks.

Although fusing machines are widely known, more precise, efficient and economical machines are greatly needed. Existing methods for the mechanical manipulation and control of a fusing electrode as related to both armature tang fusing and stator terminal fusing include pneumatically driven slides as well as ball screw driven slides controlled by a servo motor. Pneumatics have proven to be functional but include inherent deficiencies. They are not easily adjusted for fine tuning of the fusing forces. A pressure regulator may be adjusted, which will increase or decrease the fusing force, but does not give the user an actual reading of the forces since the driving cylinder output force is not directly obtainable from the regulator gauge. Alternatively, the tension on a spring results in a non-precision change in the fusing forces.

The use of servo motors to regulate the fusing forces as shown in U.S. Pat. No. 5,063,279 to Axis USA, Inc. has also proven to be inefficient. Servo motors are excellent devices for fast, accurate positioning but they are not designed to be torque limiters. Even with external force feedback gauges it is very difficult, if not impossible, to design a control system fast enough to react to a rapidly changing force curve relating the position of a ball screw driven by a servo motor to a known, constant fusing force. Another limiting factor with a servo motor is cost. Servo systems are both expensive and costly to maintain in severe applications.

One difficulty in regulating the fusing operation is in detecting that the electrode has contacted the tang. It has been proposed to use a load cell for this purpose but the force of the tang against the electrode is so small compared to the weight of the fusing head that it is very difficult to sense tang contact with a load cell. Therefore, a need exists for an improved fusing apparatus that eliminates the problems associated with previous fusing machines, produces uniform connections, and provides for an easy, quick-change of the electrode.

SUMMARY OF THE INVENTION

The present invention is a fusing apparatus for making terminal or commutator wire connections on an armature or stator which eliminates or alleviates the problems associated with prior fusing apparatus and produces uniform connections. The fusing machine is effective to deform the tang around the wire, remove insulation from the wire, and compress the tang around the wire such that a cohesive low resistance bond is formed. In accordance with the invention, the fusing cycle is initiated by detecting a low level trigger current between the electrode and the workpiece.

In the present invention an armature is held by a spindle which is effective to rotate the armature such that tangs or slots are aligned under an electrode. A pneumatic cylinder actuates a rod connected to a fusing head. Actuation of the cylinder causes the fusing head and electrode to move into contact with the tang or slot. A low electrical potential is applied to the electrode such that upon contacting the tang with the electrode, a trigger current is generated. A fusing cycle is initiated when the trigger current is detected. The fusing cycle includes a delay (or "squeeze") during which the welding or fusing current is not initiated but the electrode continues to engage the tang and begin cold forming the tang around the wire. Following the squeeze, the welding current is gradually increased and the pressure on the electrode is regulated. As the welding current increases, the insulation burns off the wire. At this stage, the tang preferably has not closed around the wire. During the balance of the cycle, the tang is closed, the welding current increased, and the wire and tang are fused. While the term "welding current" is used herein, those skilled in the art will appreciate that in the principal embodiment of the invention the workpieces are not actually welded but rather they are merely fused.

Accordingly, it is an object of the present invention to provide a fusing machine for making terminal or commutator wire connections on an armature or stator that insures precise and accurate positioning of the electrode before initiating the fusing cycle.

These and other features and advantageous of the present invention will be better understood by reference to the following detailed description, the accompanying drawings and the appended claims.

DETAILED DESCRIPTION

Figure 1:
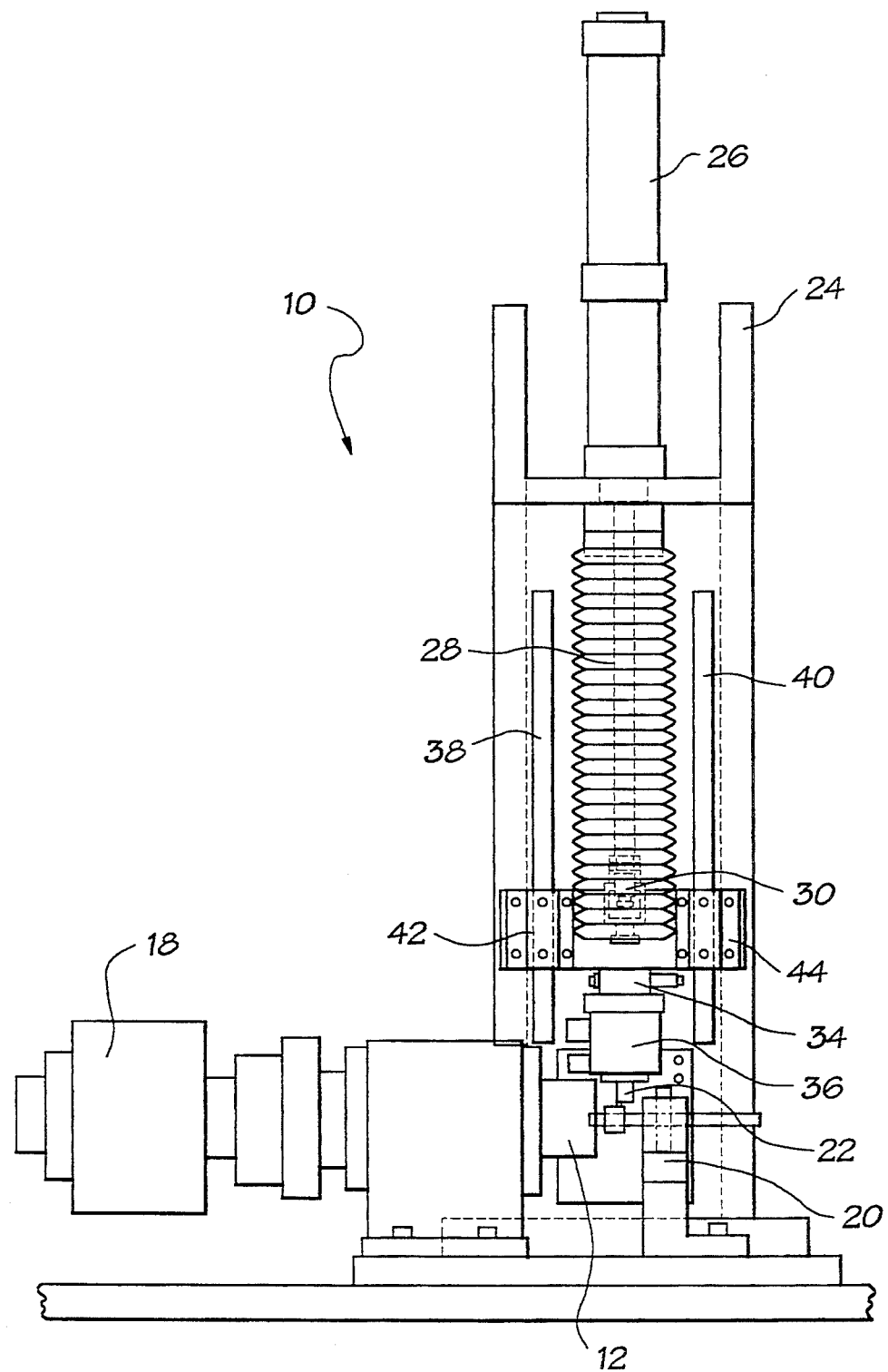
FIG. 1 is a front view of a fusing apparatus of the present invention.
Figure 2:
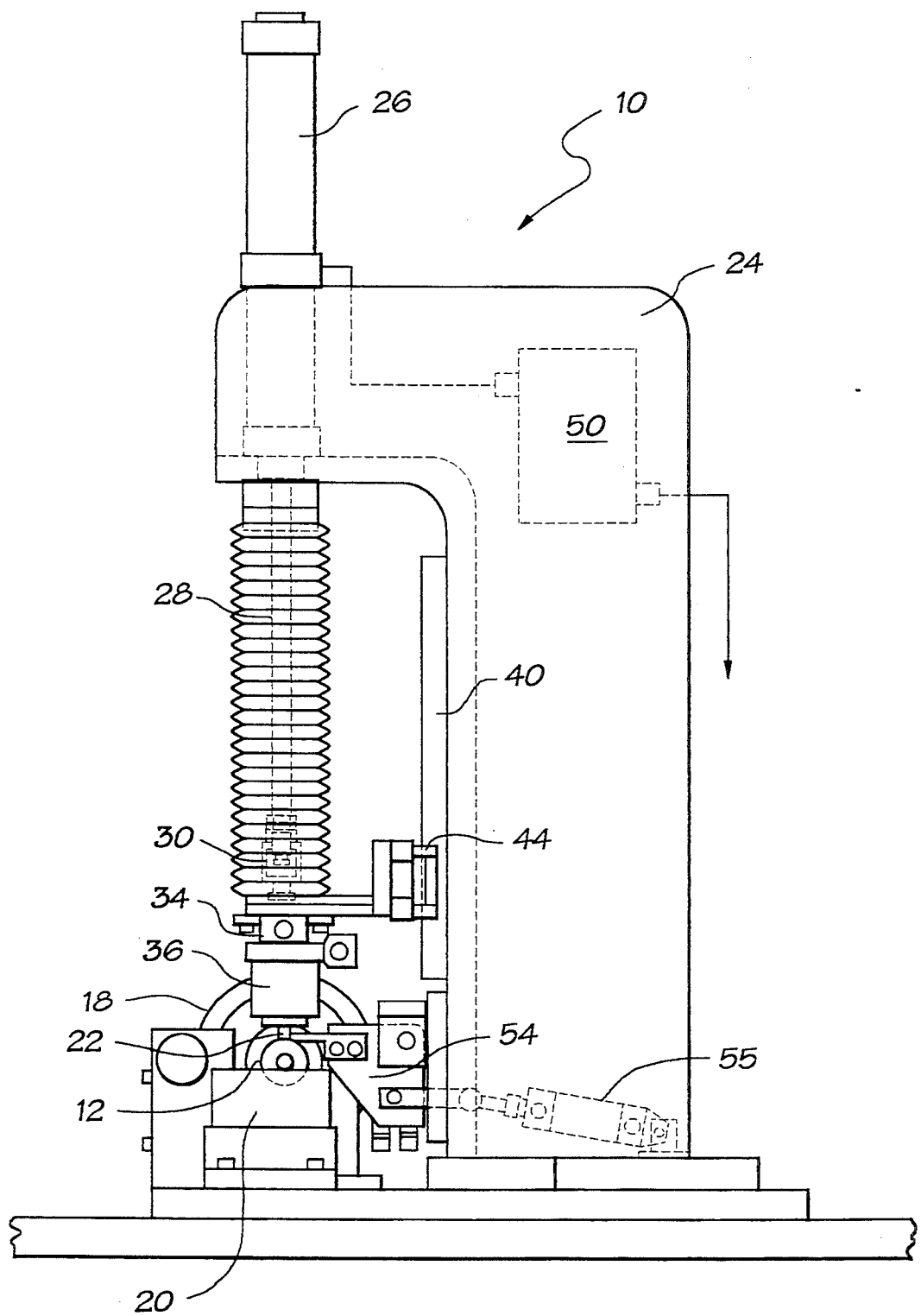
FIG. 2 is a side view of the fusing apparatus of FIG. 1.
Figure 4:
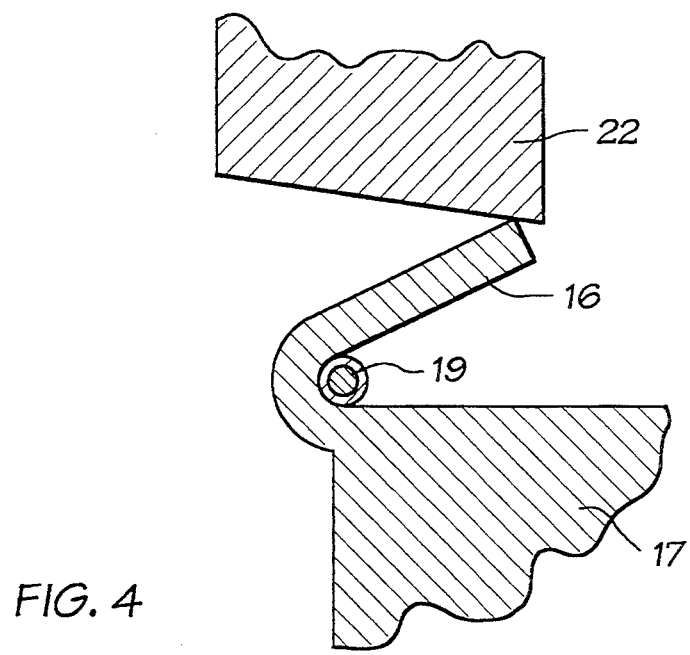
FIG. 4 is a schematic cross-sectional view of an electrode contacting the tang on a commutator bar.

A fusing apparatus, generally designated 10 of the present invention is shown in FIGS. 1 and 2. The fusing apparatus 10 is used to make terminal or commutator wire connection on an armature 12 or stator (not shown). While the invention is illustrated for making connections to an armature, those skilled in the art will appreciate that it is useful in making similar electrical connections to a stator or other electrical device. A winding machine is used to wind the armature 12 and connect the wire 19 (FIG. 4) into an open tang 16 of commutator bar 17 or slot in a known manner. The fusing apparatus 10 is effective to deform the tang 16 around the wire 19 and compress the tang such that a cohesive low-resistance bond is formed.

The armature 12 is held by a spindle at one end and is supported in a cradle 20 on the opposite end. The spindle is connected to a servo motor 18 which is effective to rotate the armature 12, such that the tangs 16 are sequentially aligned under the electrode 22.

The fusing apparatus 10 includes a support structure 24 to which a cylinder 26 is mounted with its top portion in alignment with the electrode 22. The cylinder 26 is preferably a conventional 3-position pneumatic cylinder having, in one embodiment, a 4 inch and a 3¼ inch stroke. The cylinder 26 has a cylinder rod 28 extending from the cylinder in the direction of the electrode 22. Located at the end of the cylinder rod 28 is a floating coupling 30 which connects the cylinder rod 28 to the fusing head 34. Connected to the bottom of fusing head 34 is an electrode holder 36. Ground electrode 54 contacts the workpiece, e.g., a commutator bar, to complete a secondary circuit when the electrode contacts the workpiece. A ground electrode cylinder 55 is provided to pivot the ground electrode into and out of contact with the workpiece.

The support structure 24 includes precision linear bearings 38, 40, on which journals 42, 44 positioned on the fusing head may slide. The fusing head 34 is driven upwardly and downwardly on the bearings by the cylinder 26.

A proportional regulator 50 is provided on cylinder 26 to regulate the force applied by the electrode to the tang during the fusing step. Depending on the workpiece, as the tang and wire are heated during the fusing step, less force may be required to deform the tang. If the force on the tang is not reduced, the resistance decreases and more current passes through the workpiece, rather than creating heat, the workpiece heats less and the tang may not be adequately fused. During the fusing step, the proportional regulator 50 can be actuated to reduce the force on the cylinder side of the piston.

For some workpieces, it may be desirable to increase the force of the electrode on the piece after the squeeze. For example, in some cases if the electrode strikes the tang with a large initial force, the tang may close too quickly about the wire before the insulation can be removed and a poor contact may be formed. By striking the tang with a low initial force and increasing the force later in the cycle after the squeeze, a cleaner contact can be provided.

In another embodiment, a pair of proportional regulators may be provided, one on each side of the piston, to effect the pressure adjustments desired during the fusing cycle.

Typically the electrode 22 will have to be changed several times during an operating shift. To change the electrode, the rod 28 is withdrawn through its entire 4 inch stroke to permit access to the electrode. The quick change feature described in copending application Ser. No. 07/949,383, filed Sep. 22, 1992, may be used.

In accordance with one embodiment of the invention, the trigger current is generated by a welding control apparatus. Welding control apparatus are known in the art. One example of such apparatus is a Tru-Amp III Welding Control and Current Monitor and is commercially available from Atek Corp. and is manufactured under U.S. Pat. No. 4,721,906. Typically, welder controls with current monitors control current level responsive to a current signal generated across an air core toroid coil which surrounds a portion of the secondary circuit. The current level is controlled using a high current silicon controlled rectifier switch (SCR). In accordance with the invention, as the electrode approaches the workpiece, the SCR is activated to provide low level detection current in the secondary circuit when the electrode initially contacts the workpiece. When this current is detected in the toroid, a signal is generated which starts the weld cycle.

Figure 3:
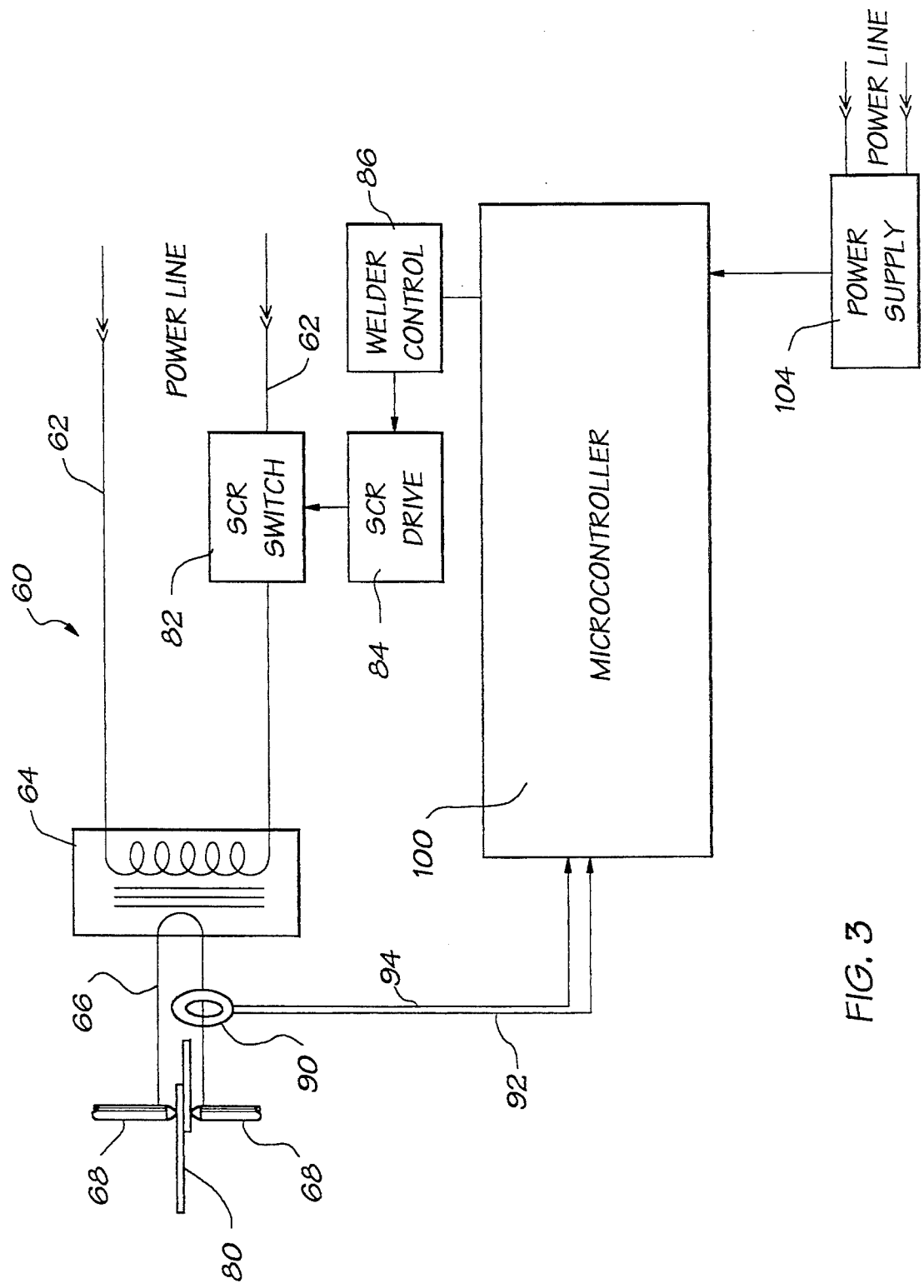
FIG. 3 is a schematic diagram of an embodiment for generating and detecting a trigger current in accordance with the invention.

FIG. 3 depicts a schematic diagram of an embodiment of the present invention used with a single phase resistance welder, an air core toroid coil, which embodies the teachings of the present invention. The single phase resistance welder 60 is provided with electric power by a pair of power lines 62. A transformer 64 steps down the power line voltage and increases the electrode current which is provided to secondary circuit 66 and electrodes 68 which heat workpieces 80. The power line voltage provided to transformer 64 is controlled by SCR switch 82, drive 84 and welder control 86. Power lines 62, transformer 64 and SCR switch 82 comprise a primary circuit. An air core toroid coil 90 (also known as a Rogowski coil or belt) surrounds a portion of secondary circuit 66 and may be located at any point in secondary circuit 66. The electrode current typically has a fixed current frequency and a fixed current period. The changes in the electrode current passing through secondary circuit 66 induces an electromagnetic force (EMF) within the toroid of air core toroid coil 90. This EMF causes a differential current signal to be generated by the coil of air core toroid coil 90 which is proportional to the rate of change of the magnetic field induced by the electrode current flowing in secondary circuit 66. Alternatively, other devices which produce a current signal can be used instead of an air core toroid coil.

The signal from the air core toroid coil 30 is fed through lines 92 and 94 to the input of processor 100. A power supply 102 supports the operation of microprocessor 100. Microprocessor 100 interfaces with the control welder controller 86 in an otherwise conventional manner except that in accordance with the invention, initiation of the fuse cycle is triggered by and timed with respect to the detection of the trigger current in the toroid.

Those skilled in the art will recognize that a variety of circuits can be used to generate and detect the trigger current. For example, a separate circuit can be established around the electrode and workpiece with its own power supply. When the fuse cycle is initiated, a relay is activated to isolate the trigger circuit from the weld current. When the cycle is complete, the relay is switched to initiate the next cycle.

The operation of the fusing apparatus preferably proceeds as follows: The 3-position cylinder advances the fusing head 34 through a $3\frac{1}{4}$ inch stroke. From this point on, all fusing head movement will be within the $\frac{3}{4}$ inch distance representing the difference between the 4 inch and the $3\frac{1}{4}$ inch strokes of the cylinder until it is desired to change the electrode whereupon the fusing head will be withdrawn through the entire 4 inch stroke.

The proportional regulator(s) are set to provide the cold forming force required to deform the workpiece. For example, a pre-set pressure of 25 psi might correspond to a cold forming force of 45 pounds.

As the fusing head 34 and the electrode 22 are advanced by cylinder 26 through the $\frac{3}{4}$ inch stroke, the SCR is periodically fired (e.g., each half-cycle or 16 milliseconds). Once the electrode 22 contacts the workpiece 16, the secondary circuit 66 is completed and a trigger current is detected by microprocessor 100 in toroid 90. A suitable trigger current is about 100 to 500 amps and can be established by firing the SCR at an appropriate firing angle based upon the transformer tap setting.

Once the trigger current is detected, the fusing cycle is initiated. A typical cycle begins with a squeeze during which the electrode 22 continues to move toward the workpiece and cold form it. The squeeze may run about 16 to 48 milliseconds. Thereafter, the fusing current is initiated through an upslope. An upslope is used so as not to hit the workpiece with too much current before there is good contact between the workpiece and the electrode. A suitable upslope might run from 16-64 milliseconds and increase current in proportional increments until full program current is reached.

Preferably, when fusing a wire to the tang or armature slot, as the fusing current is increased the insulation burns off the wire. This process is coordinated using the proportional regulator(s) with the advance of the electrode and the deformation of the tang such that the insulation is removed before the tang is formed around the wire. In this way, clean uniform connections are made.

Simultaneously with the detection of the trigger current or at such later time as may be desired, the proportional regulators are typically adjusted to reduce the force of the electrode against the tang. At the point where the weld begins, all the necessary cold-forming of the tang has taken place and less force is needed to complete the weld, therefore, as the weld begins, the regulators are actuated to relieve a portion of the force being applied by the cylinder.

When the fusing cycle is complete, the electrode is retracted only a sufficient distance to allow the spindle to position another tang or slot beneath the electrode. The process is then repeated for the remainder of the workpiece.

While the invention has been described with reference to a fusing operation, those skilled in the art will appreciate that the generation of a trigger current within a secondary circuit as described herein to control the start of a fusing operation also has application to welding operations. Hence, welding control and monitoring equipment such as the Atek unit referenced above can be modified to provide for the generation of and detection of a trigger current and used in any fusing or welding operation.

The preceding description has been presented with reference to a presently preferred embodiment to the invention shown in the drawings. Workers skilled in the art and technology to which this invention pertains will appreciate that alterations and changes in the described structure can be practiced without departing from the spirit, principles and scope of this invention.

What is claimed is:

1. An apparatus for fusing a workpiece including at least two electrically conductive elements comprising:
   an electrode;
   means for moving the electrode into contact with said workpiece causing said electrode to contact and apply a force to said workpiece;
   means for generating a trigger current upon contacting said workpiece with said electrode;
   means for detecting said trigger current and initiating a welding current which fuses said elements;
   and means for generating said welding current.

2. The apparatus of claim 1 wherein said means for generating said welding current includes a secondary circuit.

3. The apparatus of claim 2 wherein said means for generating said welding current further includes means for monitoring said welding current and means for controlling said welding current in response to said means for monitoring said current.

4. The apparatus of claim 3 wherein said trigger current is generated in said secondary circuit and said means for detecting said trigger current is a toroid around said secondary circuit.

5. The apparatus of claim 3 wherein said means for generating said welding current also generates said trigger current and said means for monitoring said welding current also detects said trigger current.

6. The apparatus of claim 2 wherein said trigger current is generated in a trigger circuit distinct from said secondary circuit and said apparatus includes means to isolate said trigger circuit from said secondary circuit when a welding current is present.

7. The apparatus of claim 2 wherein said apparatus further includes a proportional regulator located at either end of said cylinder such that the force applied to said workpiece by said electrode can be controlled by actuating said regulator.

8. The apparatus of claim 1 wherein said means for moving said electrode is a pneumatic cylinder.

9. A method for fusing a workpiece including at least two electrically conductive elements comprising the steps of:
   moving an electrode into contact with said workpiece under a predetermined force;
   generating a trigger current upon contacting said workpiece with said electrode;
   detecting said trigger current; and
   initiating a cycle which includes generating a welding current to fuse said workpiece.

10. The method of claim 9 wherein after detecting said trigger current, said method includes the step of reducing the force on said electrode.

11. The method of claim 10 wherein after detecting said trigger current there is a delay before initiating said welding current.

12. The method of claim 11 wherein said welding current is initiated through an upslope.

13. The method of claim 12 wherein said workpiece is a wire and a tang.

14. The method of claim 13 wherein during said upslope insulation is removed from said wire.

15. The method of claim 14 wherein said method includes the step of cold forming said tang around said wire.

16. The method of claim 9 wherein said trigger current is generated in a secondary circuit including said workpiece and said trigger current is detected in a toroid around said secondary circuit.

17. In an apparatus including means for generating, means for monitoring and means for controlling welding current, the improvement which comprises means for generating a trigger current upon contacting a workpiece with an electrode, said trigger current being detectable by said means for monitoring said welding current such that upon detecting said trigger current, a welding cycle can be initiated.

* * * * *